W. PODMORE.
MACHINE FOR INTERNALLY SHAPING TELEGRAPH INSULATORS AND THE LIKE.
APPLICATION FILED FEB. 11, 1916.

1,193,185.  Patented Aug. 1, 1916.
6 SHEETS—SHEET 1.

Inventor:-
William Podmore.
By his Attorney:-
Walter Gunn.

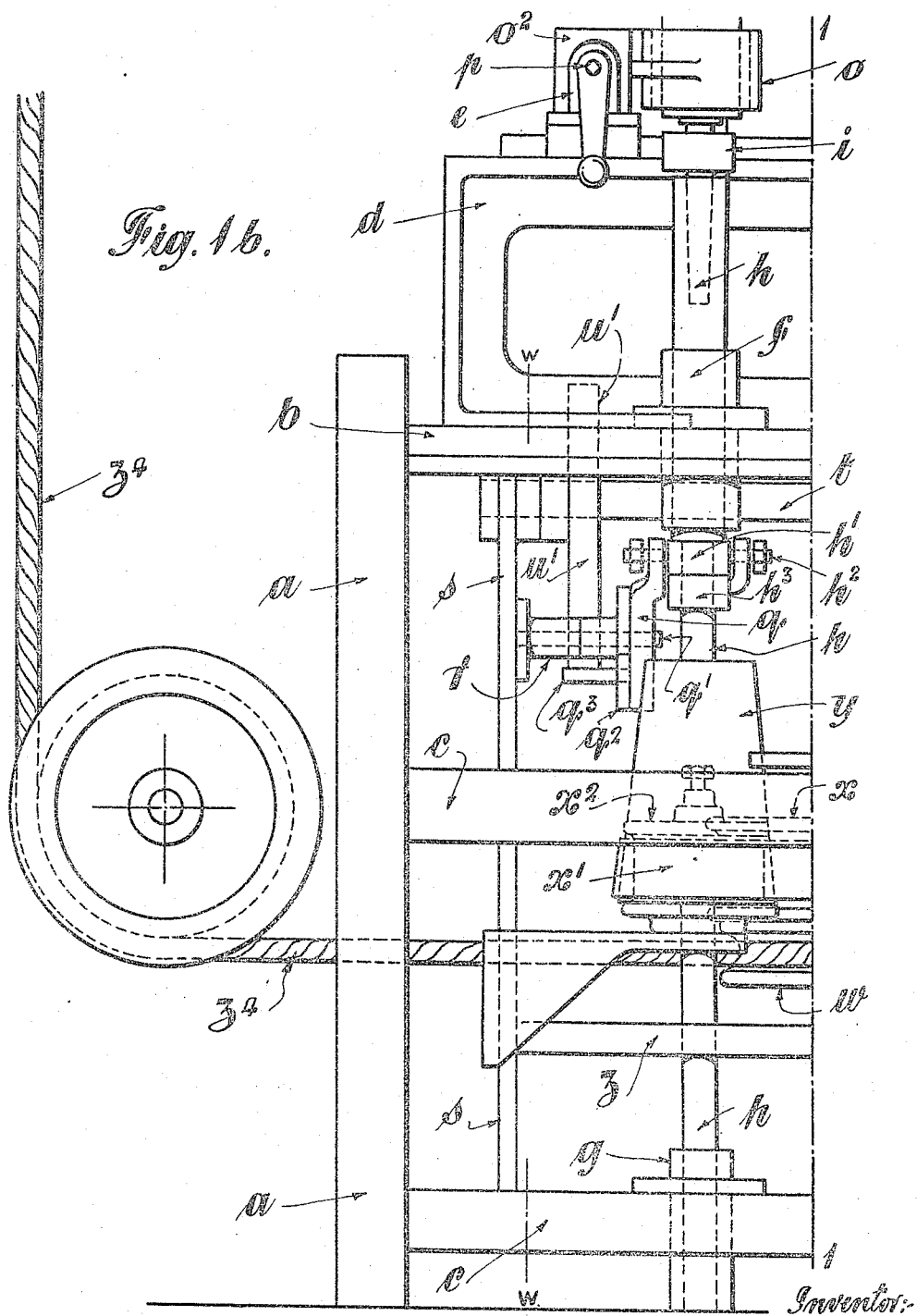

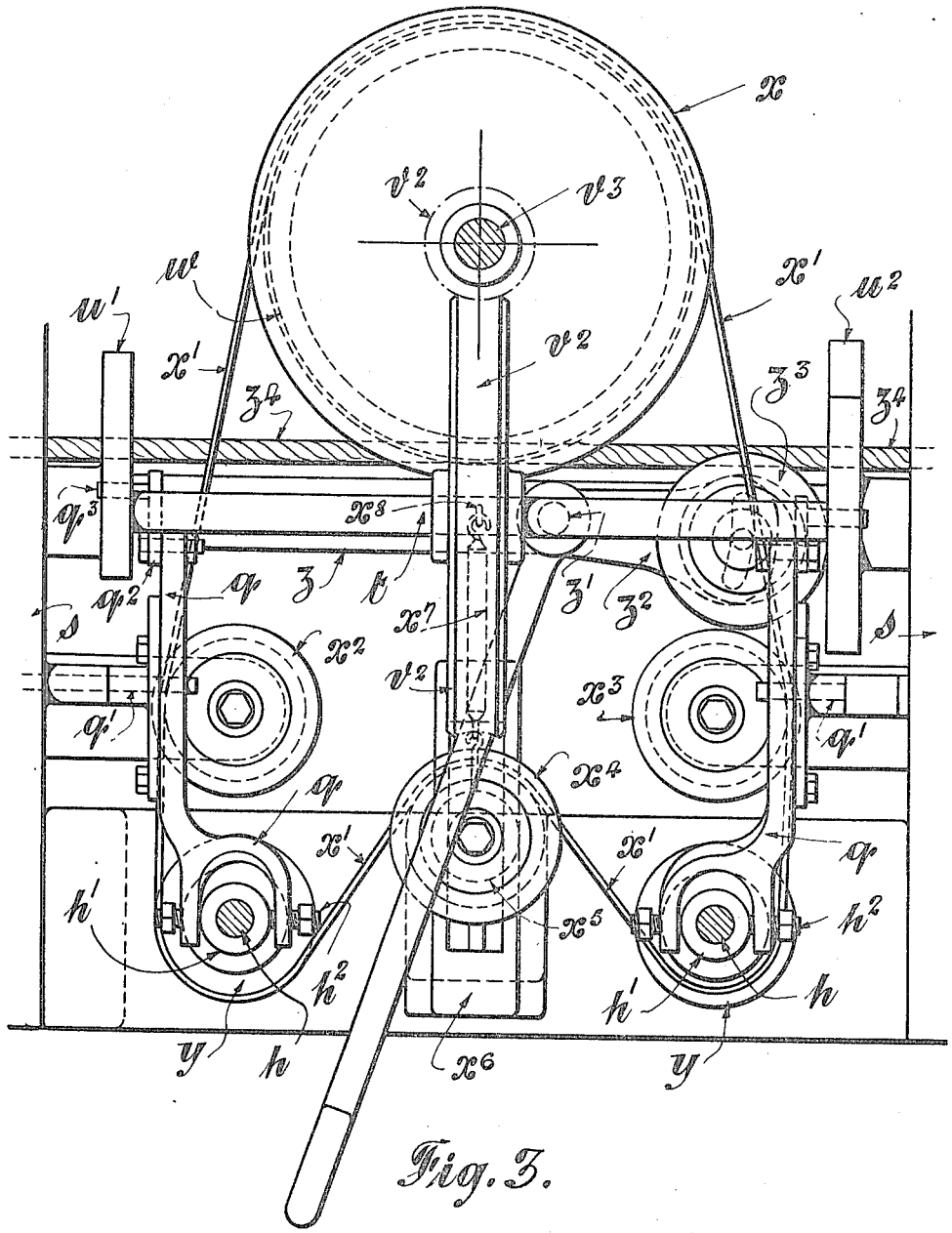

W. PODMORE.
MACHINE FOR INTERNALLY SHAPING TELEGRAPH INSULATORS AND THE LIKE.
APPLICATION FILED FEB. 11, 1916.
1,193,185.
Patented Aug. 1, 1916.
6 SHEETS—SHEET 5.
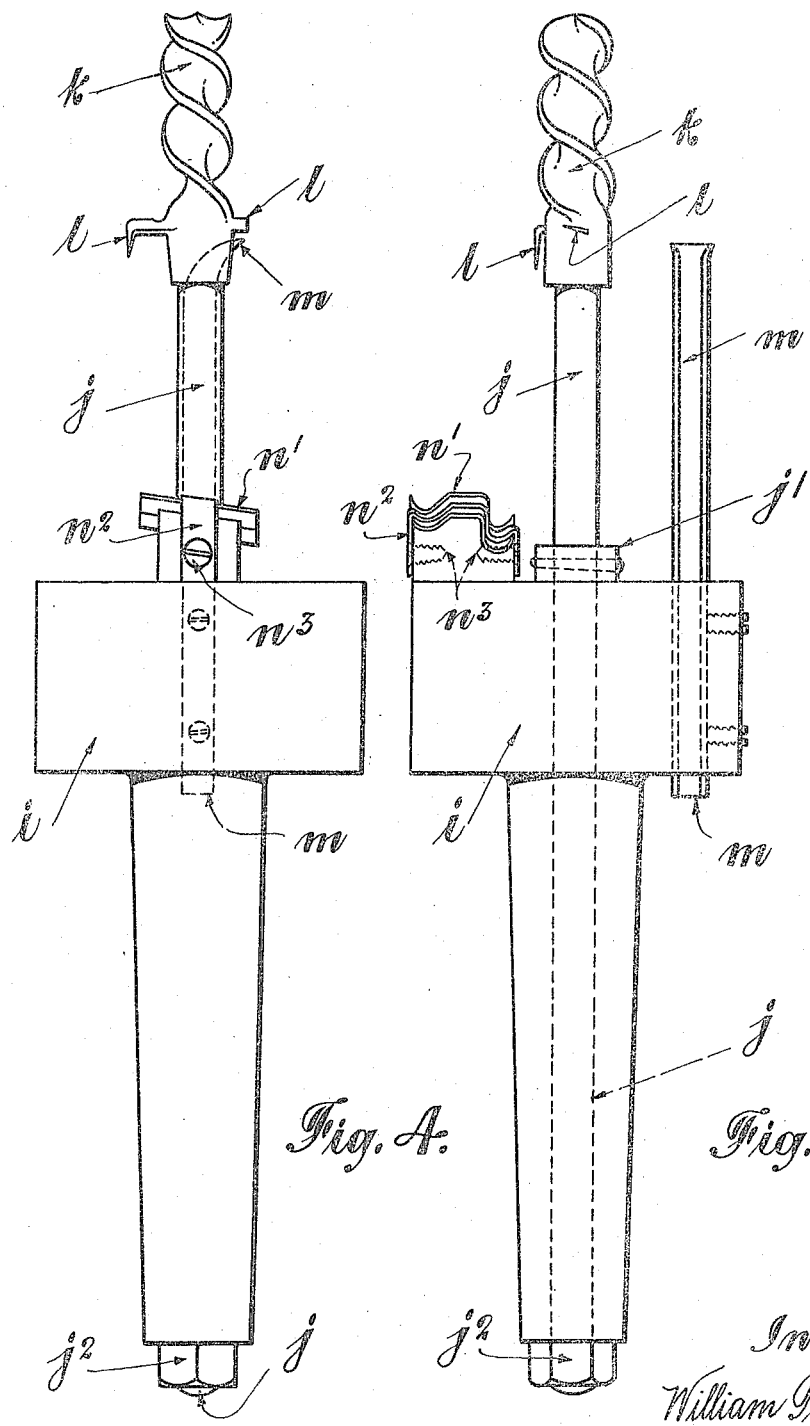

W. PODMORE.
MACHINE FOR INTERNALLY SHAPING TELEGRAPH INSULATORS AND THE LIKE.
APPLICATION FILED FEB. 11, 1916.

1,193,185.

Patented Aug. 1, 1916.
6 SHEETS—SHEET 6.

Inventor:-
William Podmore.
By his Attorney:- Walter Gunn.

UNITED STATES PATENT OFFICE.

WILLIAM PODMORE, OF PORTHILL, STOKE-UPON-TRENT, ENGLAND, ASSIGNOR OF ONE-HALF TO HENRY LEWIS DOULTON, OF LONDON, ENGLAND.

MACHINE FOR INTERNALLY SHAPING TELEGRAPH-INSULATORS AND THE LIKE.

1,193,185.  Specification of Letters Patent.  Patented Aug. 1, 1916.

Application filed February 11, 1916. Serial No. 77,665.

*To all whom it may concern:*

Be it known that I, WILLIAM PODMORE, a subject of the King of Great Britain and Ireland, and resident of Porthill, Stoke-upon-Trent, England, have invented new and useful Improvements in or Relating to Machines for Internally Shaping Telegraph-Insulators and the like, of which the following is a specification.

This invention refers to and consists of a new or improved construction of machine for internally shaping telegraph insulators and the like, the machine being of the kind comprising rising and falling tool-holders and tools.

In the known machine the speed of cutting is the same throughout the whole boring operation, with the result that, as the cutters act upon the more solid parts of the blank, the clay breaks down.

One of the objects of this invention is to provide means whereby the speed of the cutting shall be automatically and gradually reduced as the cutting proceeds, thereby reducing the percentage of breakages.

A further object is to employ means, which while reducing the cutting speed, serve also to increase the power.

Figure 2:
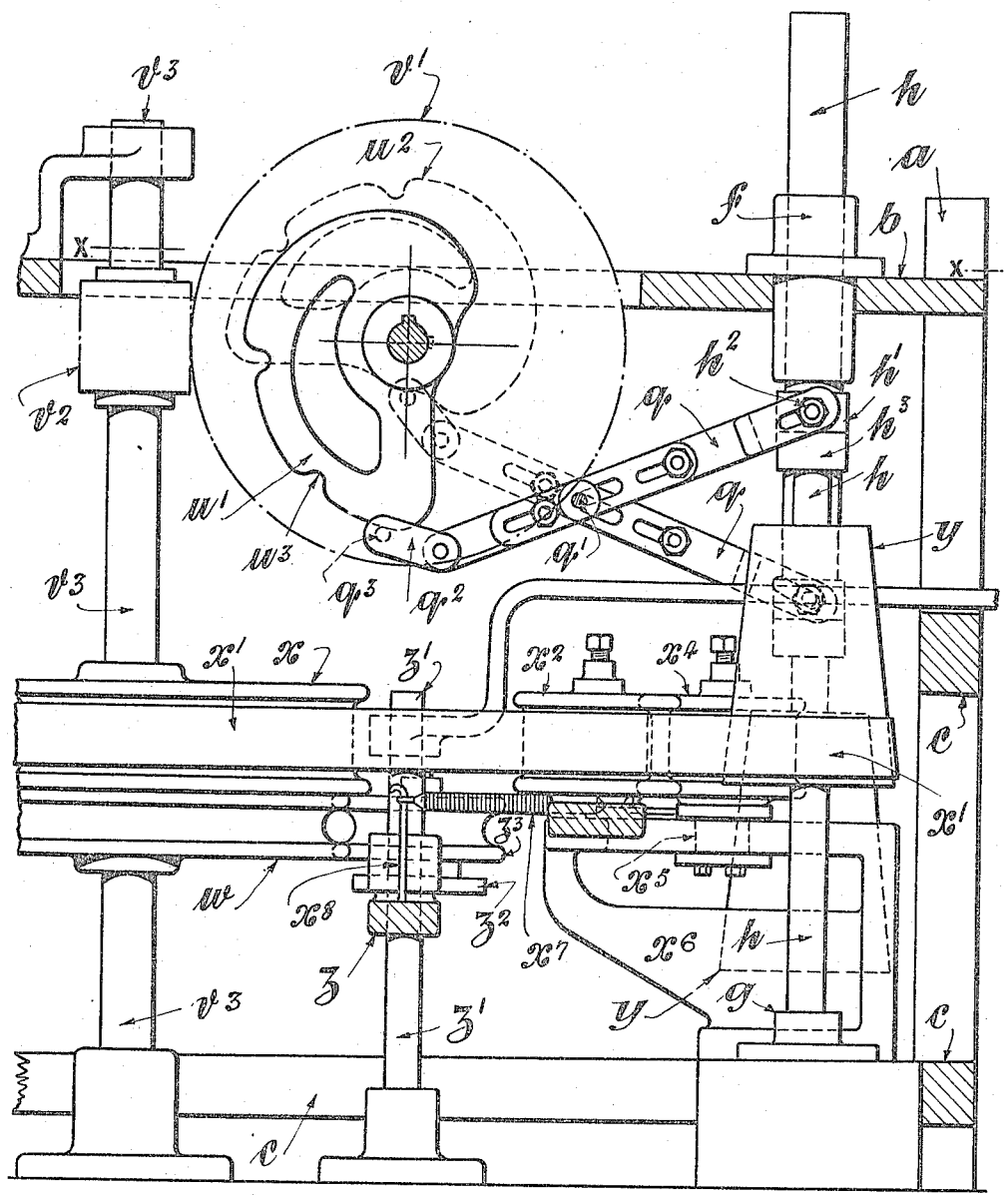
Figure 6:
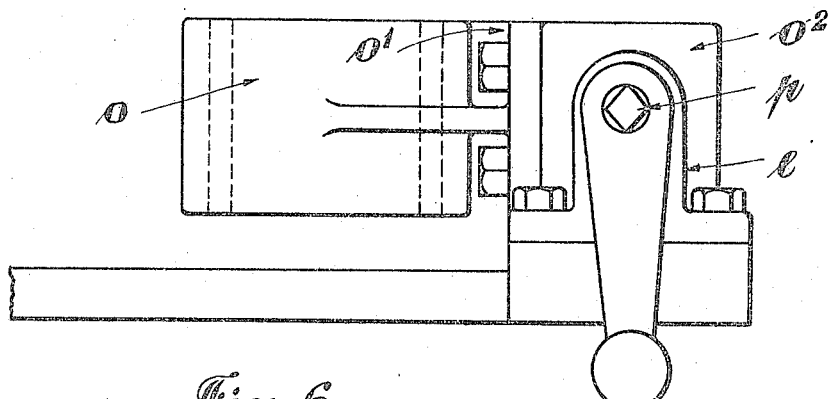
Figure 7:
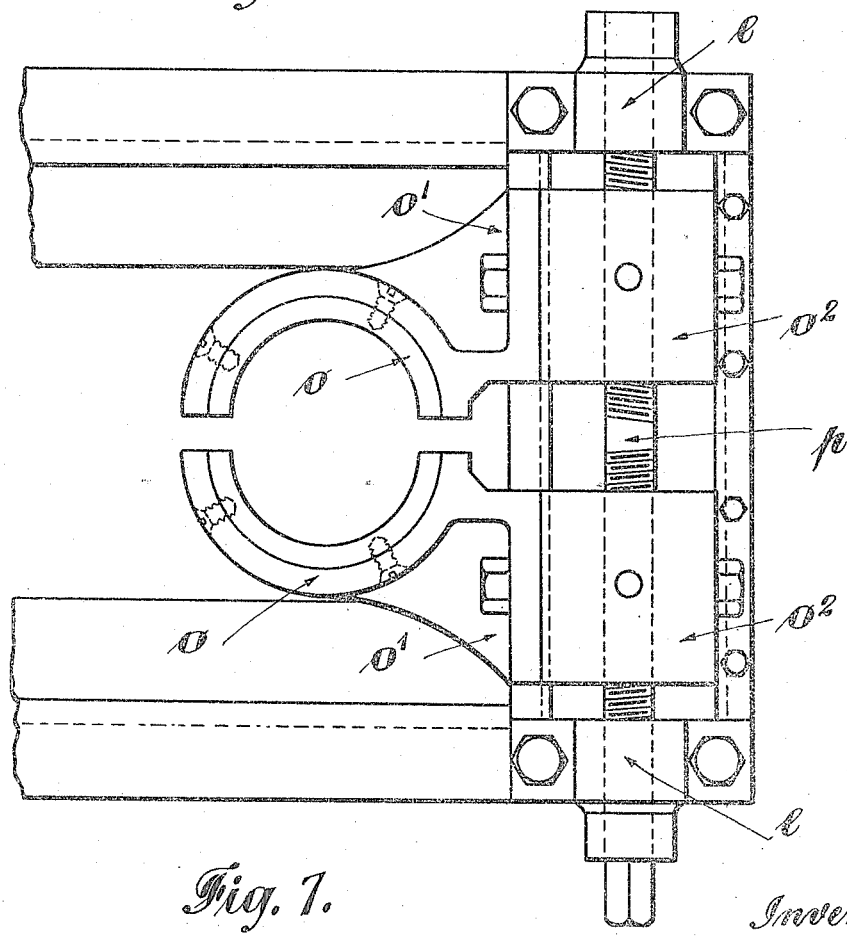

The invention will be described with the aid of the accompanying drawings, wherein:

Figures $1^a$ and $1^b$ collectively illustrate a front elevation, Fig. 2 a part (sectional) side elevation, and Fig. 3 a part (sectional) plan of a machine embodying the invention. The section in Fig. 2 is taken on line $w$—$w$ of Fig. $1^b$, and the section in Fig. 3 is taken on line $x$—$x$ of Fig. 2. Figs. 4 and 5 illustrate side views respectively taken at right angles to one another of the preferred construction of tools used in the machine. Figs. 6 and 7 illustrate a side elevation and plan respectively of one of the work-holders.

According to the invention, the preferred construction of the improved machine consists of two end parts $a$, $a$, a cross-plate $b$ and stays $c$, $c$ front and back of the machine. The machine also consists of a table-like part preferably composed of two stands $d$, $d$ secured to the cross-plate $b$, and upon which are mounted the work-holder supports $e$, $e$, see Figs. 6 and 7. Below the level of the top edges of the stands, and mounted in bearings $f$, $f$ and $g$, $g$ are two vertically disposed shafts $h$, $h$. These shafts are free to rise and fall within their bearings. They are also free to rotate. When in their lowest position the shafts $h$, $h$ may rest upon screw points (not shown) below the bearings $g$, $g$. At its top end each shaft $h$ is adapted to receive and carry a tool holder $i$ the shaft end being preferably formed with a conical recess corresponding to the tapered shank of the tool holder, see Figs. 4 and 5.

The tools carried by the tool holder may be of any suitable kind, but will preferably consist (a) of a central spindle $j$ with twist drill or boring bit $k$ and lateral cutters $l$ and (b) of one or more plain (straight) chisel-like grooving cutters $m$ adjustable vertically in the holder $i$, and lying at the required distance, or distances from the center of the holder for forming the annular groove or grooves in the insulator. Upon the holder may also be a block $n$ carrying an inclined double cutter blade $n'$ for shaping the lower edges of the insulator. The blade will be adjustably secured to the block by a metal strip $n^2$ of similar shape to the blade and held to the block by screws $n^3$.

The holders for holding the insulator blanks each preferably comprise two semi-circular gripping jaws $o$, $o$ each of which has an extension $o'$ secured to a block $o^2$ adapted to move to and fro in one of the supports $e$, $e$ secured to the top edges of the stands $d$, $d$. The block $o^2$ of each jaw is also adapted to engage a screwed spindle $p$ provided with right and left hand screw threads, see Figs. 6 and 7.

By rotating the spindle in one direction the jaws may be caused to approach each other and grip an insulator blank placed between them, while by rotating the spindle in the reverse direction, the jaws may be caused to separate and release the insulator blank. In all positions the jaws of each work-holder lie concentric to a line coaxial with the longitudinal axis of the tool-carrying shaft immediately below the work-holder.

Figure 1A:
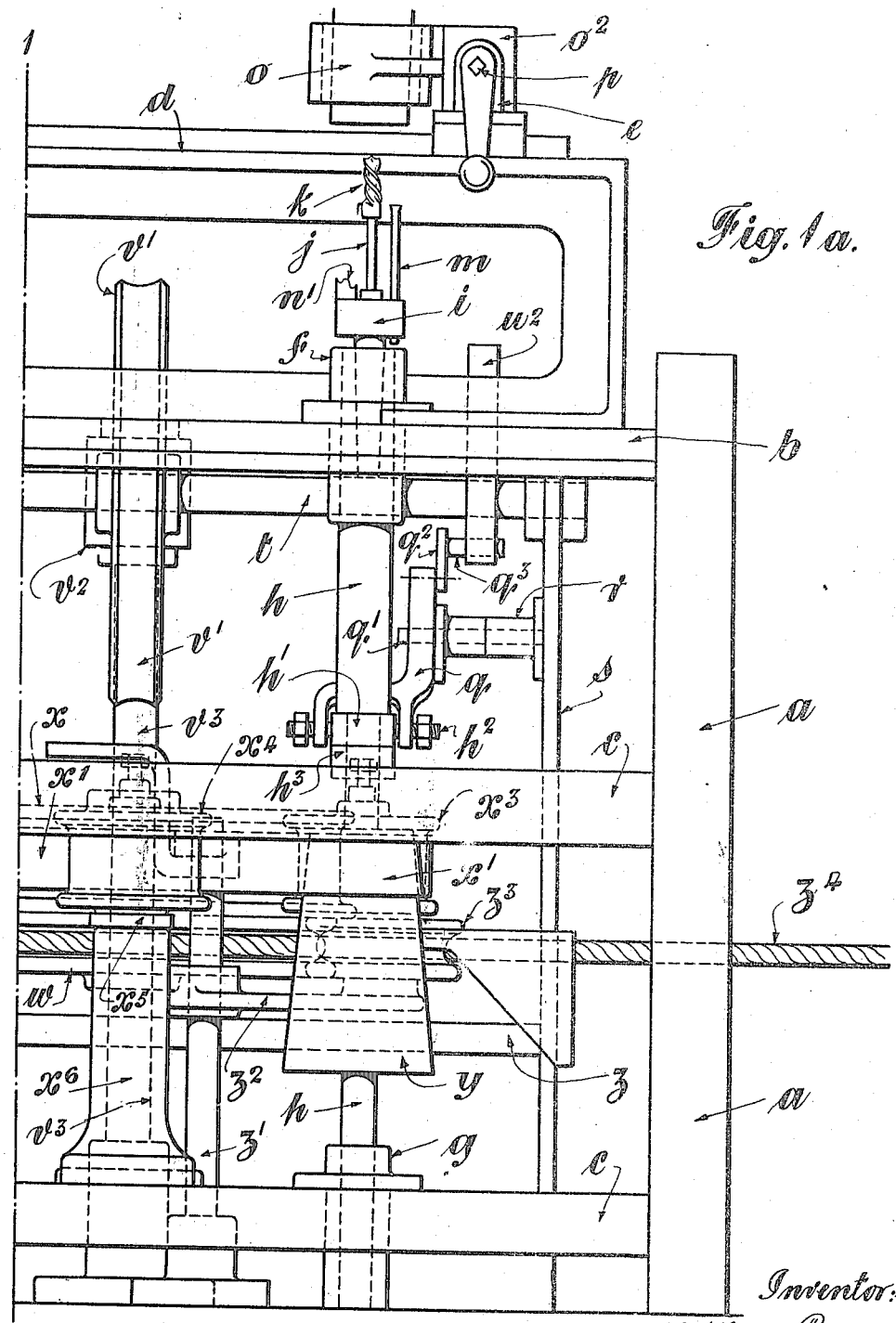

That portion of each of the shafts $h$, $h$ which slides in the bearings $f$, $f$ is of larger diameter than the lower portion, and immediately below the lower end of the part of larger diameter is a loose collar $h'$ having pins $h^2$. A further and fixed collar $h^3$ lies below the collar $h'$. Engaging the pins of each collar $h'$ is the slotted and forked end of a lever $q$, see Fig. 2. This lever is fulcrumed on a stud $q'$ carried by a bracket $r$ see Fig. 1. The bracket is adjustably mounted upon an inner metal frame $s$.

Keyed upon a horizontal shaft $t$ carried in bearings supported by the frame $s$ are two cams $u'$, $u^2$. One of such cams lies immediately behind one of the tool-carrying shafts while the other cam lies immediately behind the other tool-carrying shaft. The cam $u'$ is preferably arranged and secured to the shaft $t$ at an angle of about 90° in advance of the cam $u^2$ see Fig. 2.

To the free end of each lever is adjustably connected a small extension $q^2$ and carried by such extension is a stud $q^3$ adapted to bear against the periphery of one of the cams.

As shown in Fig. 2, when that part of the cam of largest radius lies below the shaft $t$, the lever $q$ causes the tool-carrying shaft identified with such lever to be raised to its highest position, while when that part of the cam of smallest radius lies below the shaft, the lever $q$ allows the tool-carrying shaft to lie in its lowest position. Upon the horizontal shaft $t$ is also keyed a large worm wheel $v'$, and gearing with such wheel is a worm $v^2$, this latter being keyed upon a vertical rotary shaft $v^3$. Upon this same shaft $v^3$ are also keyed a rope pulley $w$, and a large belt pulley $x$. Keyed upon the lower part of each tool-carrying shaft $h$, $h$ is a conical pulley $y$, the smaller end of the pulley being uppermost. Around the large pulley $x$ and around the conical pulleys $y$, $y$, passes an endless band or belt $x'$. This belt also passes over or around two flanged guide pulleys $x^2$, $x^3$ and a flanged jockey or tensioning pulley $x^4$, see Fig. 3. The axis of this jockey pulley $x^4$ is carried by a block $x^5$ slidably supported in a slotted bracket $x^6$ see Fig. 2, and by means of a spring $x^7$ and fixed pin $x^8$, the pulley serves to take up any slackness of the belt. The pin $x^8$ is carried by a cross-bar $z$. This bar also serves to carry a stud $z'$ upon which is fulcrumed a bell-crank lever $z^2$, at the slotted end of the shorter arm of which is carried a pulley $z^3$. This pulley $z^3$ lies and rotates in the same plane as the rope pulley $w$, and on being moved bodily in the arc of a circle in one direction it presses a driving rope $z^4$ into engagement with the pulley $w$, and thereby causes the rope to impart motion to the machine.

With the machine constructed as aforesaid, its operation is as follows: An insulator blank requiring to be bored is first placed in the work-holder, the tool-carrying shaft of which is then in its lowest position. The machine is then started, whereupon the said tool-carrying shaft is raised by its cam and lever, and the boring and grooving tools caused to act upon the insulator blank. Owing to the almost narrowest part of the conical pulley being encircled by the belt when the tools first engage the blank, the shaft and tools are rotated at the high or normal speed. As the shaft and its conical pulley are raised, and the wider parts of the pulley become encircled by the belt, the speed of the shaft and tools is gradually decreased, such decrease continuing until the shaft is at its highest point and until the tools have penetrated to the full extent into the insulator blank. By thus gradually reducing the speed of the tools, the tools act more kindly on the clay, especially when the formation of the outer wall and inner pipe part of the insulator is nearing completion. A further advantage in reducing the speed of the tools by the means described is that an increase of power is obtained when the tools require to enter the more solid parts of the insulator blank. While one insulator blank is being bored, another blank is placed in the other work-holder, the tool-carrying shaft and tools of which then rise and perform the boring and grooving operations at a gradually reduced speed in like manner to the first named shaft and tools. Upon the cutting operation being completed and the shafts and tools descending the effect of the conical pulleys being lowered is to increase the speed of the tools, and thereby insure of the rapid clearance of any debris in the borings.

As will be seen from the drawings (Fig. 2) the shape of the cams $u'$, $u^2$ is such that the tool-carrying shafts are raised at a practically uniform rate. They may, however, be of a shape which allows of the shafts being raised at a gradually diminishing rate, thus further helping to reduce the risk of breakages.

The cams may be plain, but they will preferably be formed with recesses or depressions $u^3$ to allow the tools during their upward movement to periodically make a momentary downward movement, and also to receive a momentary acceleration, thereby preventing the debris accumulating at the cutting edges of the tools. In conjunction with the speeding up of the tools at the time of their withdrawal from the work, the cams are shaped so as to cause the shafts to move down at a quick rate, thereby further facilitating the rapid clearance of the tools, as well as speeding up the rate of production. The cams will allow of a slight dwell when the shafts are in their lowest position, thus giving time for the operator to remove a bored blank and insert a fresh one in the same holder before the tools rise again.

By employing the arrangement of grooving tool shown in Figs. 4 and 5, various practical advantages are obtained. The tool can be readily adjusted in height to vary the depth of groove. It can also be readily removed for sharpening, and after sharpening it can be easily adjusted to compensate for any shortening of the tool. Further, when the tool is worn away, a new tool can be readily applied to the holder. The central twist drill spindle is secured to the holder $i$ by a collar and pin $j$ and a nut $j^2$, which allow of the spindle being removed for resharpening the drill, or for substituting a new drill.

The block $n$ carrying the insulator edge shaping cutter $n'$ may be cast solid with the holder, or it may be detachably secured. It may also be adjustably secured, by say a set screw and slot, so that it may be moved farther in or out in relation to the spindle $j$. In this connection the holder will be larger in diameter to allow for the tool $m$ being fixed in holes in the holder arranged at different distances from the center of the holder. In the case of insulators with more than one annular groove, a cutter adapted to act upon more than two edges of the insulator may be provided.

I claim:

1. Machines for internally shaping telegraph insulators and the like comprising, in combination, holders for holding clay blanks, rotary tools, means for reciprocating said tools and means for rotating the same at constantly varying speeds, substantially as described.

2. A machine for internally shaping telegraph insulators and the like, comprising, means to hold the clay blank, a rising and falling tool holder and tools, the cutting speed of which is constantly and automatically reduced as the boring proceeds, a conical pulley movable endwise and an endless belt (with tensioning means) for varying the speed of cutting, the said cone pulley being moved endwise simultaneously with the rise and fall of the tool holder, substantially as described.

3. A machine for internally shaping telegraph insulators and the like comprising, in combination, one or more clay blank holders, one or more rising and falling tool-carrying shafts, a cutter and a conical pulley, smaller end uppermost on such shaft, or on each of such shafts, a driving pulley on a further shaft, an endless belt encircling the driving pulley and the conical pulley or pulleys, together with means for tensioning the belt, as the tool carrying shaft rises and falls, substantially as described.

4. Machines for internally shaping telegraph insulators and the like, comprising, in combination, blank holders, vertically rising and falling rotary tools and tool-carrying shafts, having a constantly varying speed of rotation as they rise and fall, cams and levers, and means whereby said cams are slowly rotated to operate the levers, and, through them, raise and lower the shafts, substantially as described.

5. In a machine for internally shaping telegraph insulators and the like, the combination with a blank holder or holders and one or more vertically rising and falling rotary tools and tool-carrying shafts, having a constantly varying speed of rotation as they rise and fall, of a cam or cams and a lever or levers, one end of each lever engaging with the periphery of a cam through an adjustable extension and stud and the other end with the pins of a loose collar on one of the shafts, and means whereby said cams are slowly rotated to operate the levers and through them, raise and lower the shafts, substantially as herein set forth.

6. A machine for internally shaping telegraph insulators and the like, having, in combination, means to hold the clay or like blank, rising and falling shafts, means for reciprocating said shafts and means for rotating the same at speeds varying in proportion to the vertical position of said shafts, tool holders and tools on said shaft, the latter comprising a central boring tool and one or more ordinary chisel-like grooving cutters detachably and adjustably secured to the holder at the required distance, or distances, from the center of the holder, substantially as described.

In witness whereof I have hereunto set my hand in the presence of two witnesses.

WILLIAM PODMORE.

Witnesses:
PATTIE PLANT,
JOHN H. COPESTAT.